Figure 1:
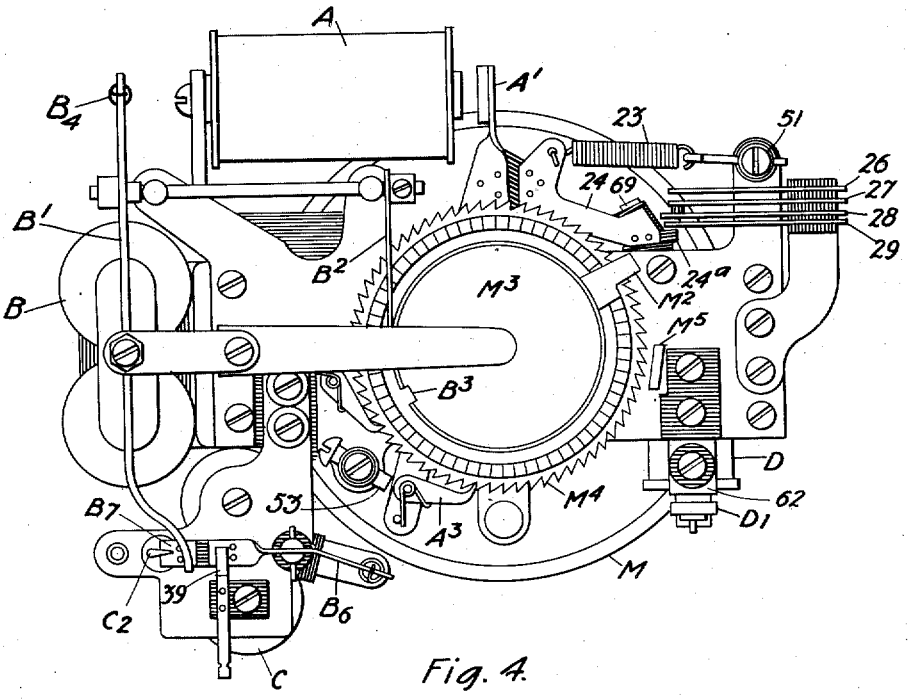

F. A. LUNDQUIST.

TELEPHONE EXCHANGE.

APPLICATION FILED NOV. 13, 1915.

Reissued Feb. 22, 1921.

15,048.

13 SHEETS—SHEET 1.

Witnesses:
O.D.M. Guthe.
A. C. Niechers

Inventor:
Frank A. Lundquist
by A. C. Shannel. Att'y

F. A. LUNDQUIST.

TELEPHONE EXCHANGE.

APPLICATION FILED NOV. 13, 1915,

Reissued Feb. 22, 1921.

15,048.

13 SHEETS—SHEET 2.

Witnesses:
O. D. M. Guthe.
A. C. Niechers

Inventor:
Frank A. Lundquist
by A. C. Brunel. Att'y.

F. A. LUNDQUIST.

TELEPHONE EXCHANGE.

APPLICATION FILED NOV. 13, 1915.

Reissued Feb. 22, 1921.

15,048.

13 SHEETS—SHEET 3.

Witnesses:
O. D. M. Guthe.
A. C. Niechers

Inventor:
Frank A. Lundquist.
by A. C. Munel. Atty.

F. A. LUNDQUIST.

TELEPHONE EXCHANGE.

APPLICATION FILED NOV. 13, 1915.

Reissued Feb. 22, 1921. 15,048.

13 SHEETS—SHEET 4.

Witnesses:
O. S. M. Guthe.
A. C. Nielsen

Inventor:
Frank A. Lundquist.
by A. C. Fennel Att'y.

F. A. LUNDQUIST.

TELEPHONE EXCHANGE.

APPLICATION FILED NOV. 13, 1915.

Reissued Feb. 22, 1921. 15,048.

13 SHEETS—SHEET 5.

Witnesses:
A. D. M. Guthe.
A. C. Niechers

Inventor:
Frank A. Lundquist.
by A. C. Munel. Atty.

F. A. LUNDQUIST.

TELEPHONE EXCHANGE.

APPLICATION FILED NOV. 13, 1915.

Reissued Feb. 22, 1921.

15,048.

13 SHEETS—SHEET 6.

Witnesses:
O. D. M. Guthe.
A. C. Niechers

Inventor:
Frank A. Lundquist.
by A. C. Munnel. Att'y.

F. A. LUNDQUIST.

TELEPHONE EXCHANGE.

APPLICATION FILED NOV. 13, 1915.

Reissued Feb. 22, 1921.

15,048.

13 SHEETS—SHEET 7.

Witnesses:
O. D. M. Guthe.
A. C. Theobers

Inventor:
Frank A. Lundquist.
by A. C. Mauer. Att'y.

F. A. LUNDQUIST.

TELEPHONE EXCHANGE.

APPLICATION FILED NOV. 13, 1915.

Reissued Feb. 22, 1921.

15,048.

13 SHEETS—SHEET 8.

Witnesses:
O. D. M. Guthe
A. C. Nichers

Inventor:
Frank A. Lundquist
by A. C. Hunnel, Att'y.

F. A. LUNDQUIST.

TELEPHONE EXCHANGE.

APPLICATION FILED NOV. 13, 1915.

Reissued Feb. 22, 1921.

15,048.

13 SHEETS—SHEET 9.

Witnesses:
O. D. M. Guthe.
A. C. Niechers

Inventor:
Frank A. Lundquist.
by N. C. Stanner Att'y.

F. A. LUNDQUIST.

TELEPHONE EXCHANGE.

APPLICATION FILED NOV. 13, 1915.

Reissued Feb. 22, 1921. 15,048.

13 SHEETS—SHEET 10.

Witnesses:
O. D. M. Guthe.
A. C. Niechers

Inventor:
Frank A. Lundquist
by A. C. Dunne Att'y

F. A. LUNDQUIST.

TELEPHONE EXCHANGE.

APPLICATION FILED NOV. 13, 1915.

Reissued Feb. 22, 1921.

15,048.

13 SHEETS—SHEET 11.

Witnesses:
O. D. M. Guthe.
A. C. Niechers

Inventor:
Frank A. Lundquist
by A. C. Dunne Att'y.

F. A. LUNDQUIST.

TELEPHONE EXCHANGE.

APPLICATION FILED NOV. 13, 1915,

Reissued Feb. 22, 1921.

15,048.

13 SHEETS—SHEET 12.

Witnesses:
O. D. M. Guthe.
A. C. Niechers

Inventor:
Frank A. Lundquist.
by A. C. Bunnell Att'y.

F. A. LUNDQUIST.

TELEPHONE EXCHANGE.

APPLICATION FILED NOV. 13, 1915.

Reissued Feb. 22, 1921.

15,048.

13 SHEETS—SHEET 13.

Witnesses:
O.D.M. Guthe.
A.C. Wiesbers

Inventor:
Frank A. Lundquist
by S. T. Bunnell
Att'y.

UNITED STATES PATENT OFFICE.

FRANK A. LUNDQUIST, OF PORTLAND, OREGON, ASSIGNOR, BY MESNE ASSIGNMENTS, TO WESTERN ELECTRIC COMPANY, INCORPORATED, A CORPORATION OF NEW YORK.

TELEPHONE-EXCHANGE.

15,048. Specification of Reissued Letters Patent. Reissued Feb. 22, 1921.

Original No. 1,135,121, dated April 13, 1915, Serial No. 158,443, filed May 23, 1903. Application for reissue filed November 13, 1915. Serial No. 61,406.

*To all whom it may concern:*

Be it known that I, FRANK A. LUNDQUIST, a citizen of the United States of America, and a resident of Portland, county of Multnomah, and State of Oregon, have invented certain new and useful Improvements in Telephone-Exchanges, of which the following is a specification.

My invention relates to automatic exchanges in which the calling subscriber selects the telephone called, and has for its object improvements in the construction and arrangements shown in my Patent Number 606.764, issued July 5, 1898, and in my Patent No. 747,197, issued December 15, 1903. The main switches and telephone boxes are similar to those shown in the first-named patent, but differ in some details. The plan of making electrical connections through an auxiliary switch, as described in the second-named patent, is continued in this, but the construction of the auxiliary switches is different and a different system is employed in making such connnections.

Figure 4:
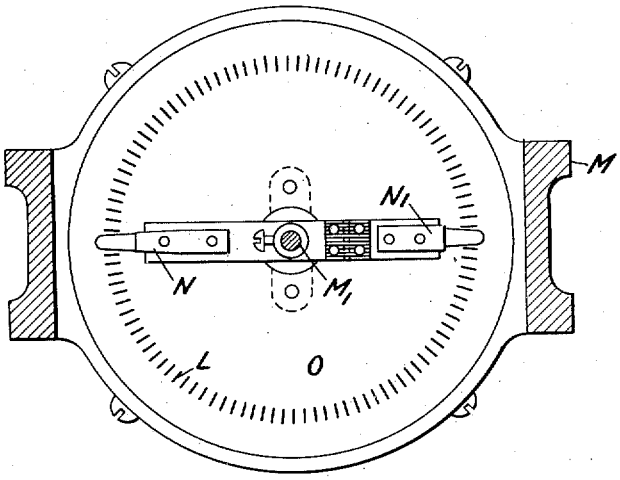
Figure 2:
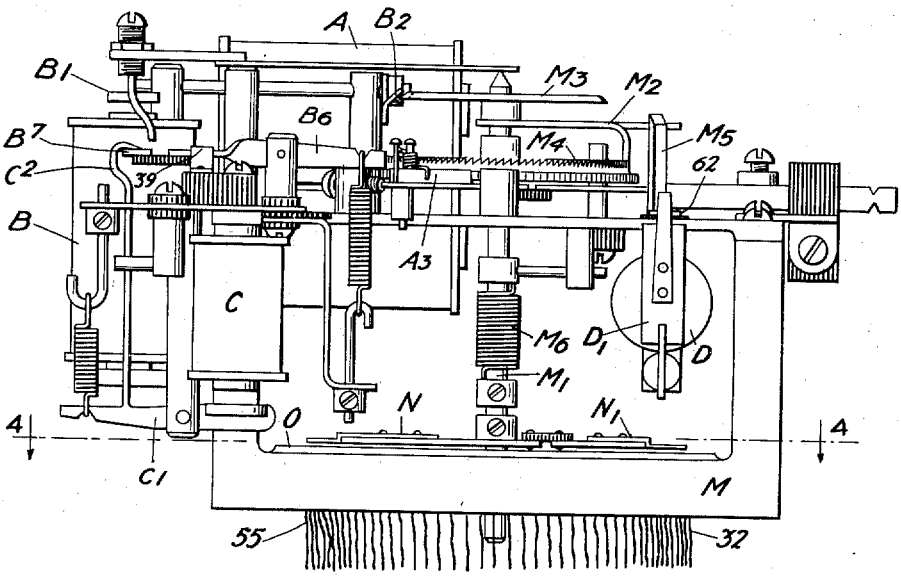
Figure 3:
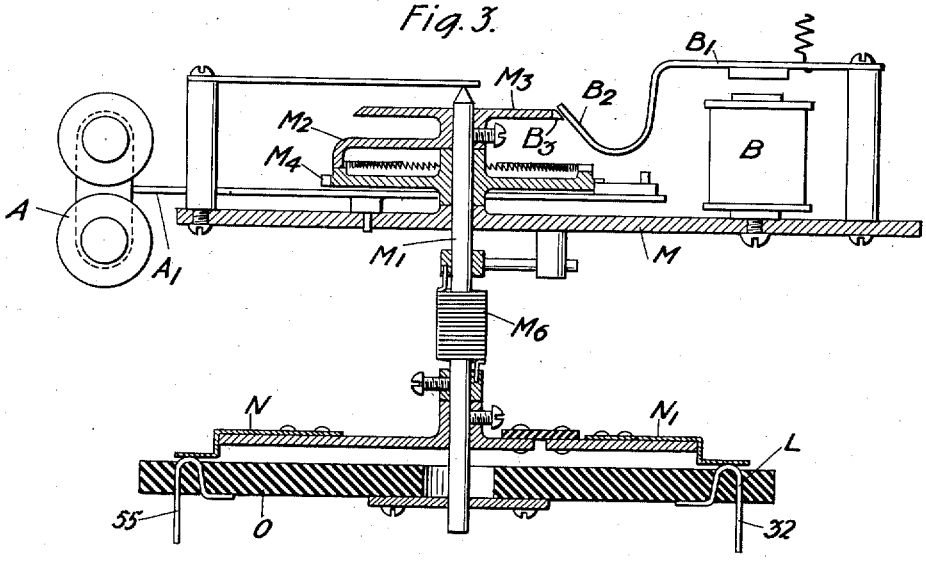
Figure 5:
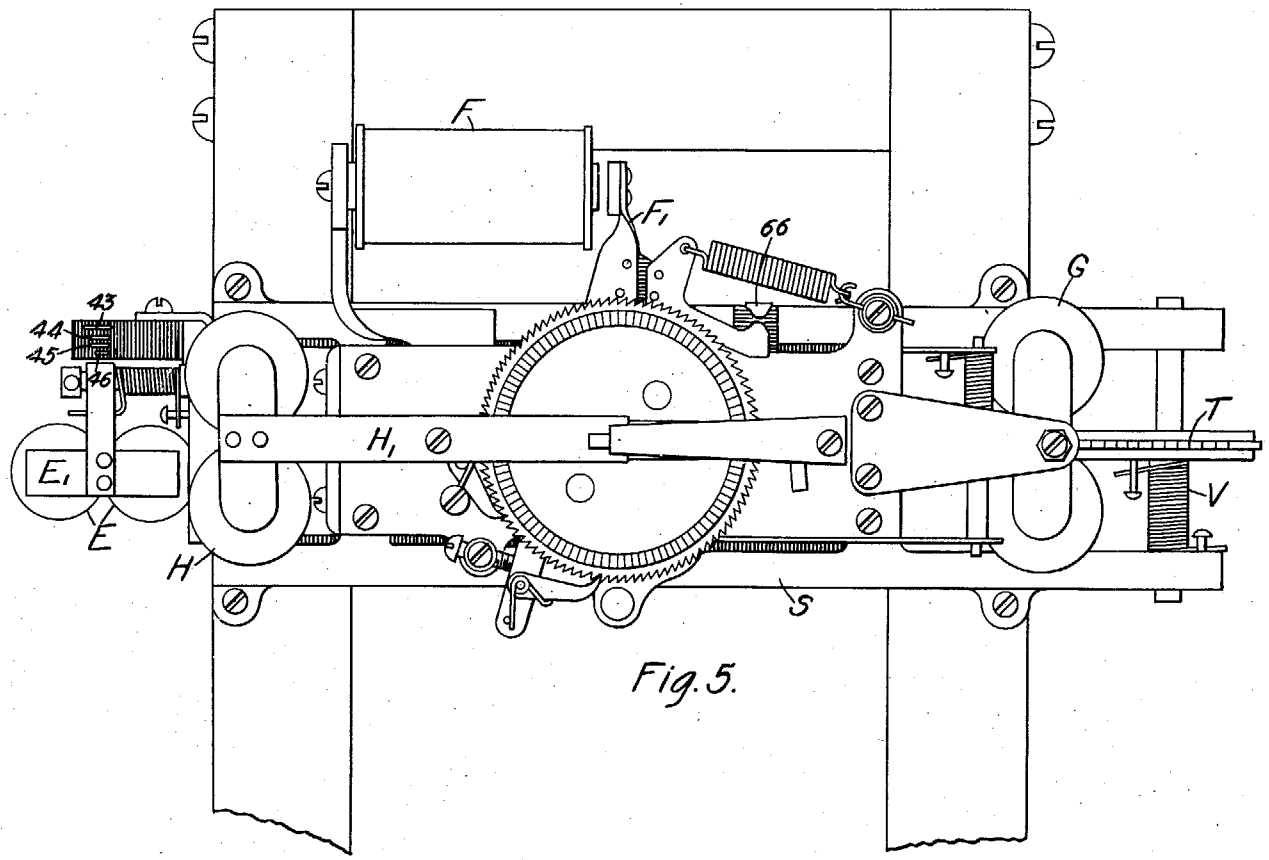
Figure 6:
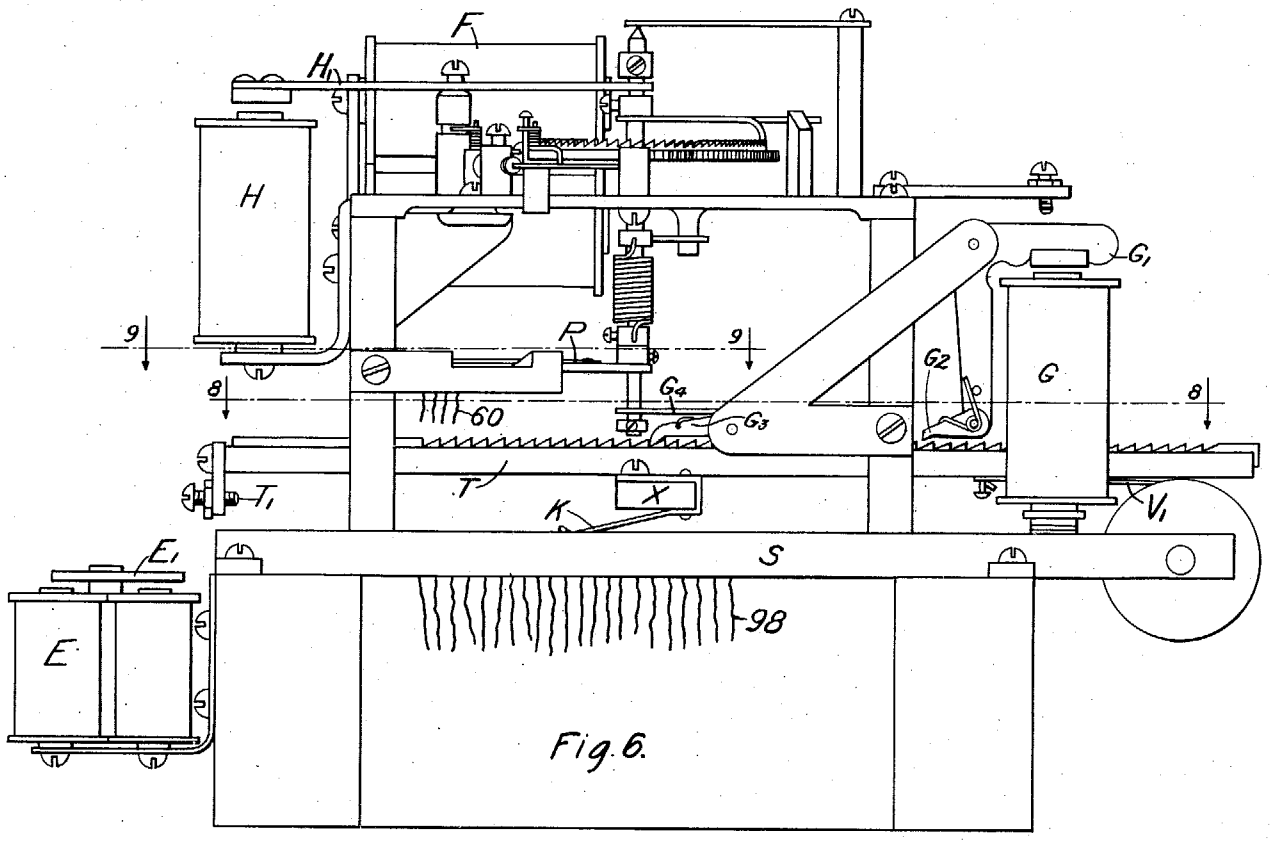
Figure 7:
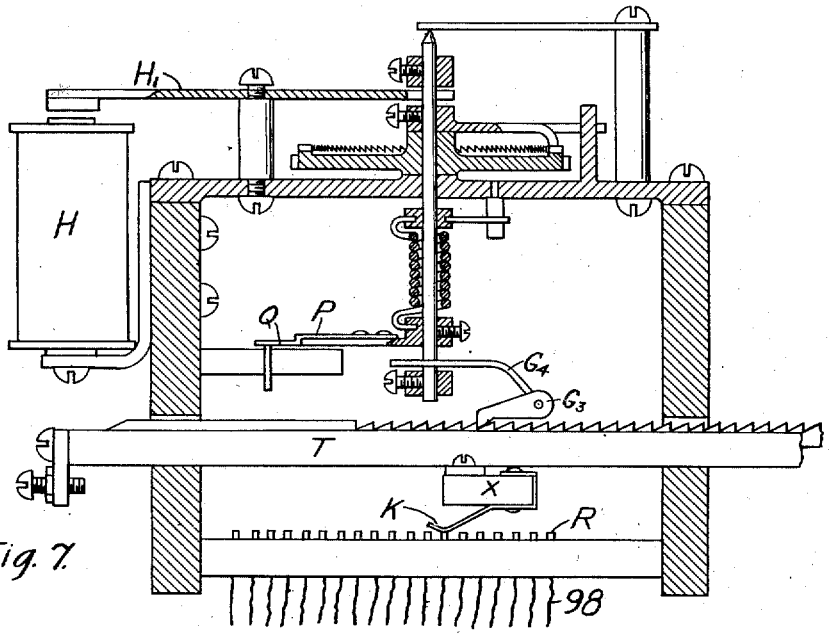
Figure 11:
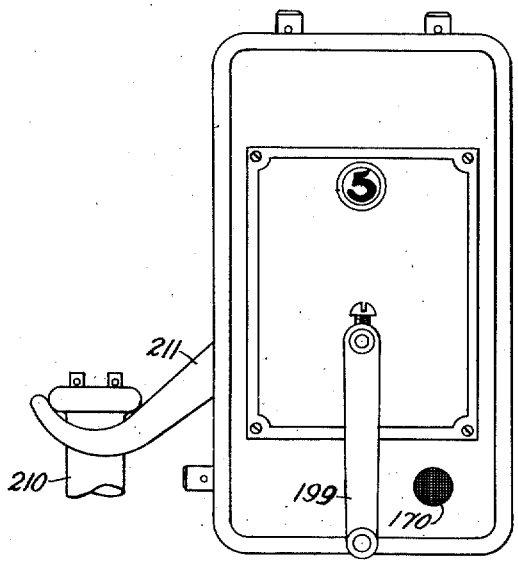
Figure 8:
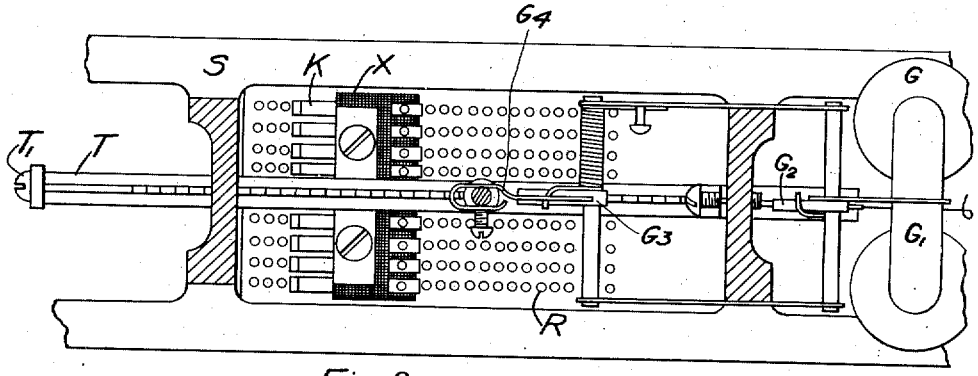
Figure 9:
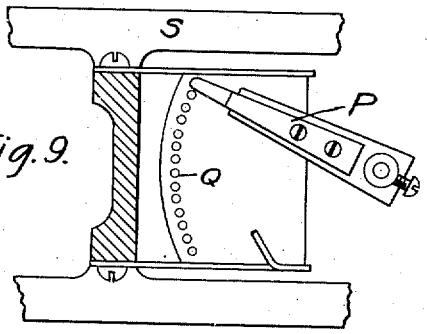
Figure 10:
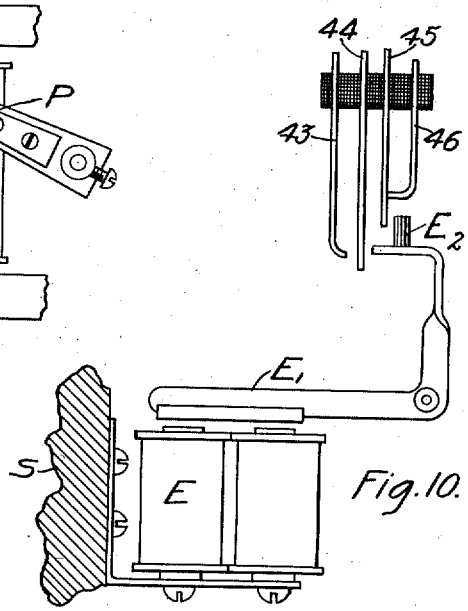
Figure 12:
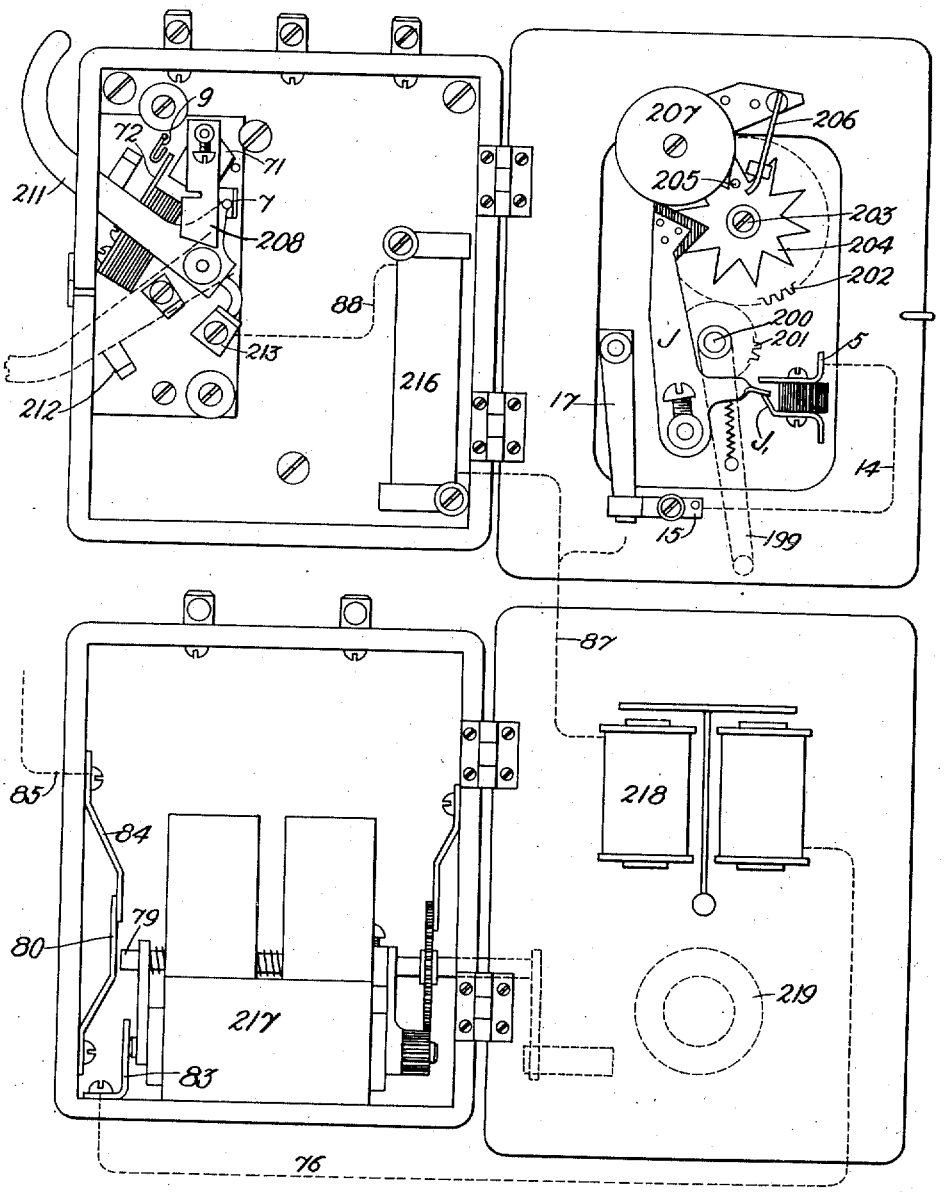
Figure 13:
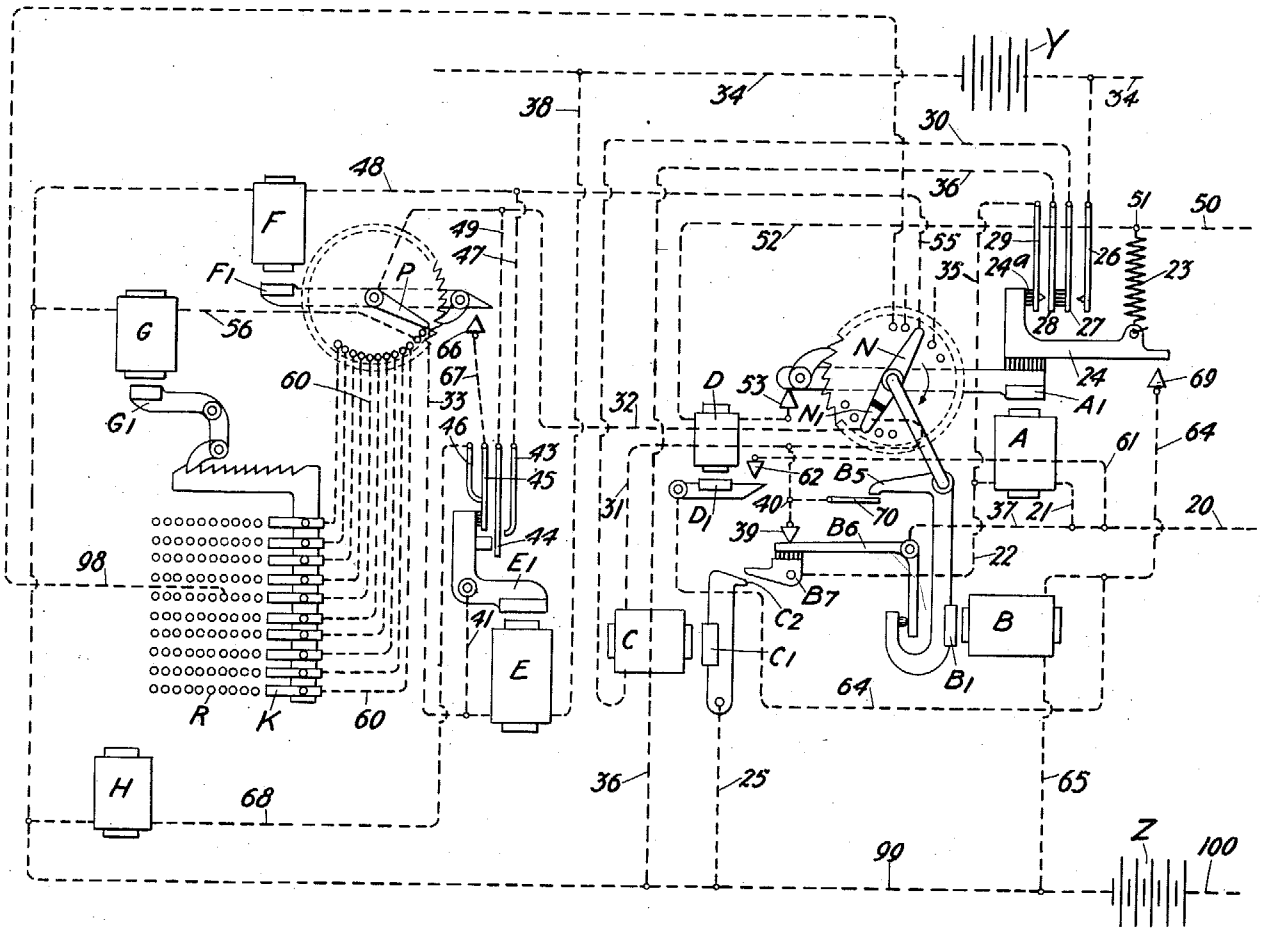
Figure 14:
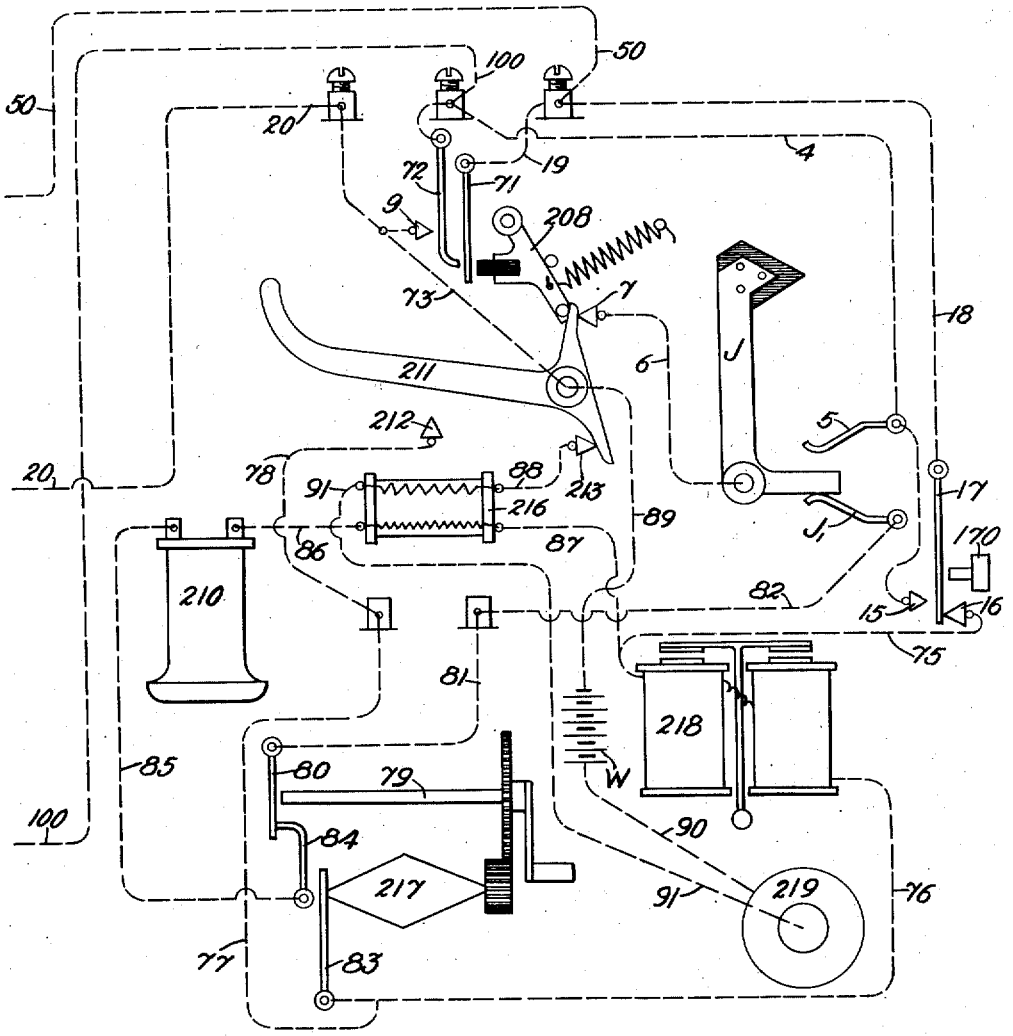
Figure 15:
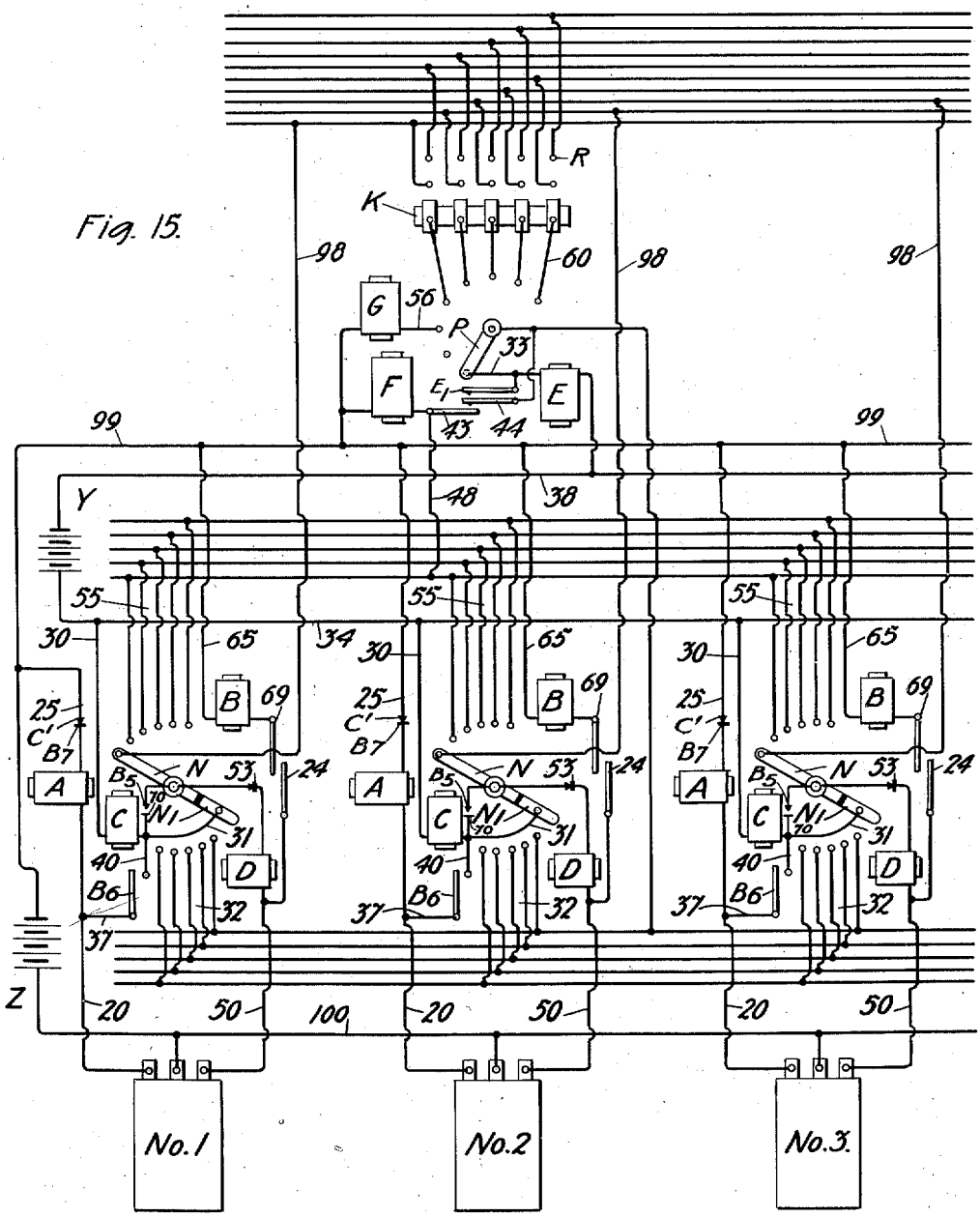
Figure 16:
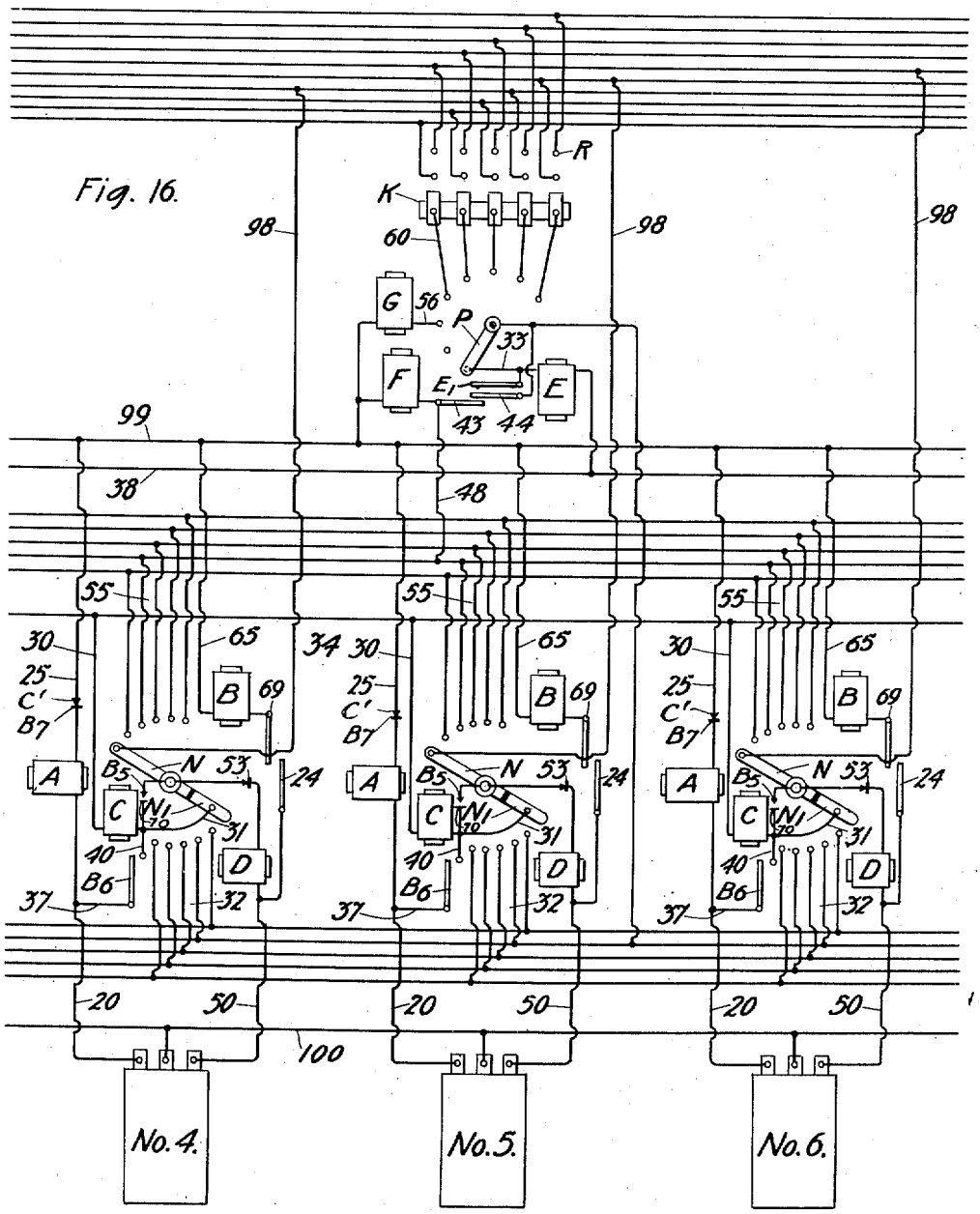
Figure 17:
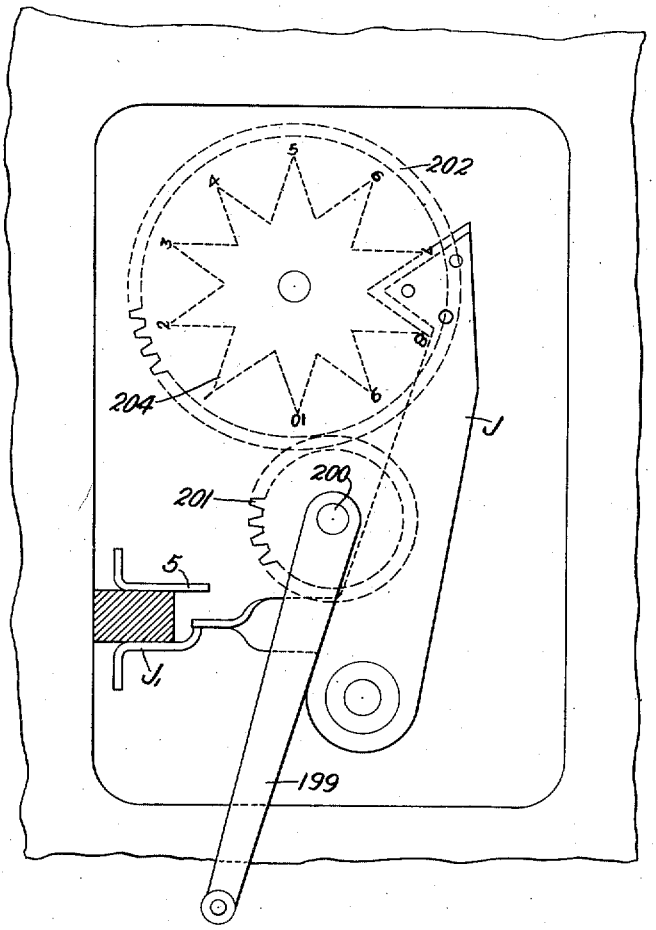
Figure 18:
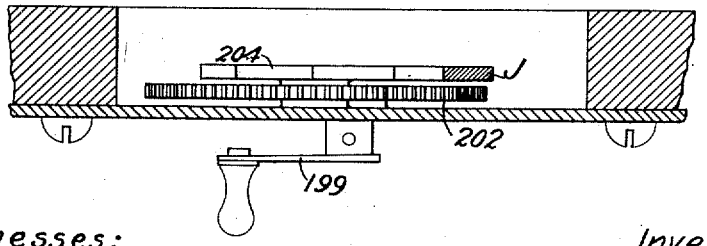
Figure 19:
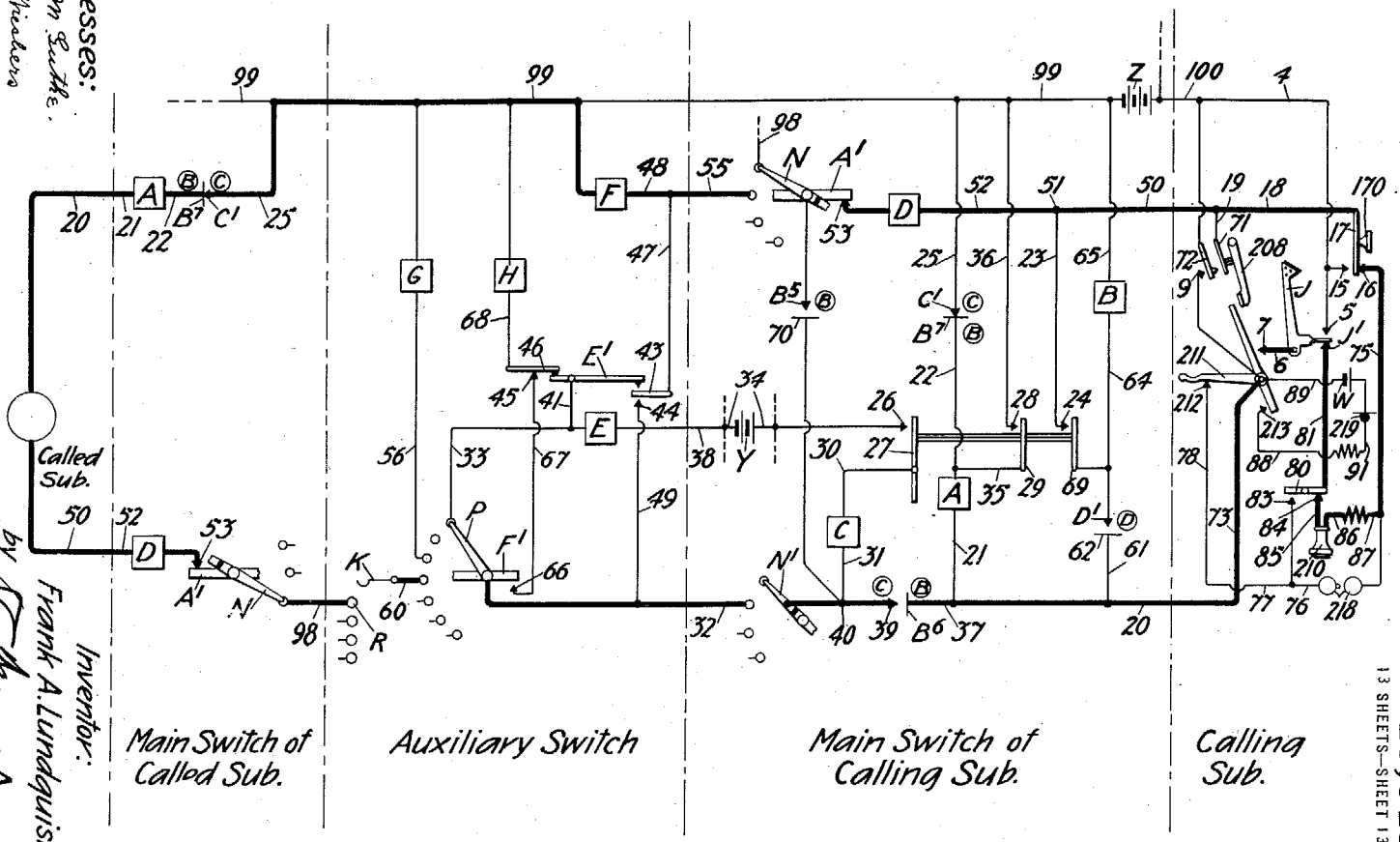

In the accompanying drawings Figure 1 is a plan of one of the main switches; Fig. 2 is an elevation of the same; Fig. 3 is a vertical section of the same partially diagrammatic; Fig. 4 is a section on line 4—4 of Fig. 2; Fig. 5 is a plan and Fig. 6 is a side elevation of one of the auxiliary switches; Fig. 7 is a partial vertical section corresponding to Fig. 6; Fig. 8 is a horizontal section on line 8—8 of Fig. 6, the magnets at the right being in plan; Fig. 9 is a section on line 9—9 of Fig. 6; Fig. 10 is a diagrammatic view showing the operation of the parts at the extreme left of Figs. 5 and 6; Fig. 11 is a front elevation of the upper telephone box; Fig. 12 is an interior view of the two telephone boxes showing part of the electric circuits; Figs. 13 and 14 taken together are a diagram showing the complete circuits for one telephone, one main switch and one auxiliary switch; Figs. 15 and 16 taken together are an abridged diagram showing six telephones (marked respectively, No. 1, No. 2, etc.) with their corresponding main switches, and two auxiliary switches; Fig. 17 is a front elevation with the dial and connected mechanism removed from its supporting plate; and Fig. 18 is a plan of the same the supporting cover being shown in section; Fig. 19 is a diagrammatic view to illustrate in a more simple manner than Figs. 13 and 14, of Figs. 15 and 16, the circuits and electromagnets used in establishing a talking circuit between two subscribers.

In the said drawings M is a switch carrying frame or base in which is mounted an insulating disk O provided with a series of contact points L. Supported in the frame M is a vertical spindle $M^1$ upon the upper end of which is an arm $M^2$ and a disk $M^3$, while upon the lower end of said spindle is secured an arm having the end N in electrical connection therewith and the end $N^1$ insulated therefrom. The ends N and $N^1$ come into contact with the contact points L. Loosely mounted about the spindle $M^1$, and supported on the frame M, is a ratchet wheel $M^4$ provided with both spur and crown teeth. A magnet A, with its armature lever $A^1$ and pawl $A^3$, serves to turn the wheel $M^4$ by engagement with the spur teeth thereof. The arm $M^2$ is normally in engagement with the crown teeth so that the turning of the wheel $M^4$ serves to also turn the spindle $M^1$, and consequently the arms N and $N^1$. Supported at a suitable place on the frame or base M is a magnet B whose armature lever $B^1$ has a flexible end $B^2$ that normally rests next to the beveled edge of the disk $M^3$ as shown in Fig. 3. At one place in the periphery of the disk $M^3$ is cut a notch $B^3$. The spindle $M^1$, and the parts connected thereto, have a normal position which is determined by contact between the arm $M^2$ and a stop $M^5$ on the base M. When in normal position, the notch $B^3$ comes in line with the lever $B^1$. After the spindle $M^1$ and its connected parts have been moved by the action of the magnet A, they may be returned to normal position by sending a current through the magnet B, which action moves $B^1$ and causes the flexible end $B^2$ to slide over the beveled edge and under the disk $M^3$. Then, as soon as the current is broken through B, the spring $B^4$ tilts the lever $B^1$ to raise the disk $M^3$, and consequently the arm $M^2$, free from the teeth of the wheel $M^4$. The spring $M^6$ then returns the spindle $M^1$ to normal position, when the notch $B^3$ being in line with $B^2$, the parts settle down with $M^2$ again in contact with the teeth of the wheel $M^4$. The action of the magnet A is, therefore, to move the arms N and $N^1$ by successive steps into contact with the points L, and the action of B is to release these arms and permit them to be returned to normal position.

When the magnet B draws down the lever $B^1$ it makes an electrical contact between $B^5$ and 70 (see Fig. 13.) It also tilts a lever $B^6$ which carries an insulated contact point $B^7$ adapted to slide under, and be caught and held by, the hook $C^2$ on the armature lever $C^1$. When the magnet C attracts $C^1$ it releases $C^2$ from $B^7$ and permits the lever $B^6$ to fall back against the contact point 39. A fourth magnet D serves to make electrical contact between $D^1$ and 62. Secured to, but insulated from, the lever $A^1$ is a bent lever 24, to one end of which is connected a spring 23 that retracts the armature from the magnet A, and to the other end of which is fastened an insulating piece $24^a$. Adjacent to $24^a$ are four insulated strips 26, 27, 28, and 29. These are normally separated from each other, but the tilting of the lever 24 closes the contact between 26 and 27, and also between 28 and 29. Contact is prevented between 27 and 28 by a piece of insulation carried by one of them and located between the two. The tilting of the lever 24 also makes a contact between it and an adjacent strip 69.

The auxiliary switch is shown in Figs. 5 to 10 inclusive. The upper part of this switch is practically the same as that of the main switch just described and does not need additional description beyond the statement that the magnet F turns the pointer P over the contact points Q, and magnet H releases the pointer so as to permit it to be returned to normal position. In the lower part of the frame S are supported a series of insulated contact points R from which run the wires 98. The points R are arranged in rectangular form and the total number is equal to, or greater than, the total number of telephones in the exchange. There are preferably nine or ten contact points R in each transverse row, and there are as many rows as necessary to make the full number for the required exchange. Supported over the contacts R is a ratchet rack T parallel with the greater length of the auxiliary switch. The rack T is moved step by step to the left by magnet G, armature lever $G^1$ and pawl $G^2$. A spring V and cord $V^1$ serve to draw the rack T to the extreme right, which is its normal position. A set screw $T^1$, adapted to come into contact with part of the frame S, serves to determine the extreme movement to the right. A pawl $G^3$, supported in the frame S, serves to hold the rack T from being retracted by V and $V^1$, until the said pawl $G^3$ is released. This release is effected by an arm $G^4$ which is connected to the main spindle of the switch, so that when the magnet H raises this spindle to permit the pointer P to return to its normal position, it also releases $G^3$ and permits the rack T to also be returned to its normal position. Secured to the rack T is a cross-head, or carrier, which carries a series or group of insulated strips, or contact devices, K, adapted to make simultaneous contact with all of the contact points R in any one of the transverse rows. The operation of these parts is that the magnet G moves the strips K forward (to the left) by successive steps into contact with the rows of contact points R, and the magnet H releases the holding devices so as to permit V and $V^1$ to return the strips K to the extreme (normal) position to the right. The operation of the magnet E at the left end of the auxiliary switch is shown diagrammatically in Fig. 10. Adjacent to the armature lever $E^1$ are four insulated metal strips 43, 44, 45 and 46. The strips 45 and 46 are normally in contact with each other, while the strips 43 and 44 are normally separated; but when magnet E is energized, insulated stud $E^2$ on armature $E^1$ separates 45 and 46, and $E^1$, 44 and 43 are brought into electrical connection with each other.

The telephone boxes are similar in their general arrangement to those shown in my previously mentioned patents. On the front cover of the upper box is a crank 199 for turning the spindle 200 and gear 201 which meshes into a larger gear 202 on the spindle 203. Connected to, and turning with, the gear 202 is a ten-pointed star wheel 204 which engages an insulated piece on the lever J. Normally the lever J is in the position shown in the drawings, with its shorter end in contact with the contact point $J^1$, but the rotation of the star wheel 204 vibrates the lever J so that the said shorter end makes alternate contacts between 5 and $J^1$. A pin 205 on the wheel 204 comes into contact with the striker 206 of the bell 207 once during each rotation of said wheel, consequently the bell 207 rings once for each ten times that the lever J connects to the contact 5. From the contact 5 a wire 14 runs to another contact 15 against which a spring 17 may be pushed by a push button 170 located on the front cover. The receiver 210 is supported on the ordinary hook 211, which, in its lowest position, is in contact with the point 212 and in its upper position with the points 7 and 213. The hook or lever 211 is so arranged that during its descending motion it will move a secondary lever 208, so as to cause electrical contact between 71, 72, and 9 (see Fig. 14.) and will release this contact before it reaches its lowest position. During the upward motion the lever 211 catches or hooks on to the lever 208 so that when it again descends, it again makes contact between 71, 72, and 9. This process of hooking on and releasing is substantially the same as that shown in my patents before mentioned. Also in the upper box is the ordinary induction coil 216, and in the lower box is the generator 217, the ringer 218, and the transmitter 219. There are also certain binding posts and contact points, the purpose of which is evident from the drawings. The various parts mentioned are connected together by electrical connections in the manner illustrated in the drawings, and which will be readily understood by following through the electrical circuits hereinafter described.

In carrying this system of telephone exchange into operation I place a large number of main switches (one for each telephone) in a central exchange, and with them a lesser number of auxiliary switches. In my Patent No. 747,197 I supplied one auxiliary for each group of nine or ten main switches, thus making it necessary for a subscriber to first select the proper auxiliary switch and later to select the proper main switch of those connected to the auxiliary switch. In the present application I connect all of the main switches to each auxiliary switch and then provide means for automatically making connections through the first unemployed auxiliary switch. By this means I not only avoid the necessity of selecting the proper auxiliary switch but I am able to furnish better service with a less number of auxiliary switches. For example, in my Patent No. 747,197 while the first auxiliary switch is in use, no other person can talk to any of the subscribers who are reached through that auxiliary switch, and consequently it may happen that there will be frequent delays by different subscribers waiting for a particular auxiliary switch when there are several idle ones. In my present arrangement, a delay can occur only when all of the auxiliary switches are in use, and connections can be made as soon as any one is at liberty without any respect to which one it is. To accomplish this I run a wire 98 from the normal contact point for the pointer N of the first main switch, and from this wire I run branches to the first contact point in the first transverse row of contact points in each auxiliary switch. From the normal contact point for N of the second main switch I run a similar wire with branches to the second contact of each auxiliary switch. From the third main switch are similar connections to the third contact of each auxiliary switch, and so on. It will therefore be apparent that the 17th main switch would be connected to the seventeenth contact point in the rectangular arrangement of each auxiliary switch, which for convenience sake would be the seventh contact in the second row of contacts. Or, stated in the other way, telephone number seventeen may be reached at its normal for N through the seventeenth contact of any auxiliary switch. In the same way telephone No. 328 would be reached through the eighth contact in the thirty third row of any auxiliary switch. In each main switch the contact point for N next beyond the normal has a wire 55 that runs to the magnet F of the first auxiliary switch. From the third contact a wire 55 runs to the magnet F of the second auxiliary switch, and so on. Or stated in the other way, from the magnet F of the first auxiliary switch, runs a wire with branches to the second contact point for N of each main switch. From F of the second auxiliary switch a wire with branches connects to the third contact for N of each main switch, and so on. In Fig. 13 of the drawings these connections are shown as made between the 46th main switch and the second auxiliary switch, the other connections being left unshown but would be made in the same manner between any main switch and any auxiliary switch. The pointer $N^1$ being on the same spindle with pointer N moves with it and both are on their normal contact points at the same time. The normal contact point for $N^1$ is a blank, but from the second point a wire runs to the pointer P of the first auxiliary switch, from the third point to P of the second auxiliary switch, and so on. From the normal contact point for P of each auxiliary switch a wire runs to the magnet E for that switch and thence to a line running through the battery Y. The second contact point for P is a blank. The third contact point has a wire running to the magnet G and thence to a line running through the battery Z. The succeeding contact points in regular order run to the first, second, third, etc., strips or contact devices K.

When a subscriber wishes to call another he removes his receiver, turns the crank 199 until the bell 207 rings once and pushes the button 170 once. If it is telephone number forty-six he wants, he turns crank 199 till the figure four shows on the dial in front, (which dial is the marked front face of the gear 202 or a disk secured thereto), and then pushes button 170 six times. He then turns the generator crank to call and waits for reply. When through talking he hangs up the receiver. This explains the operations as far as the calling subscriber is concerned. The called subscriber simply takes down and hangs up his receiver.

Turning now to the automatic operations resulting from the operations of the calling subscriber (see Figs. 13, 14 and 19), the removal of receiver 210 from the hook 211 permits the said hook to rise in the ordinary manner and come into contact with 7 and 213. The turning of crank 199 until the bell 207 rings once vibrates the lever J ten times and makes ten contacts with 5. Upon making a contact at 5 the current flows from battery Z—100—4—5—J—6—7—211—73—20—21—A—22—$B^7$—$C^1$ ($B^7$ being normally under and in contact with $C^1$)—25—99—Z. Each time the current is thus sent through A it actuates magnet A and moves the pointers N and $N^1$ over their respective contact points until the pointer $N^1$ reaches a contact whose wire 32 is connected to an auxiliary switch which is not in use and consequently has its pointer P on its normal contact point. When such a contact point is reached the contact between 26 and 27 (which is closed each time magnet A attracts its armature) permits a current to flow from battery Y—34—26—27—30—C—31—$N^1$—32—P—33—E—38—Y. Sending a current through C releases the hook on $C^1$ from $B^7$ and permits $B^6$ to fall back against 39. This breaks the connection so that the current can no longer flow through magnet A by way of $C^1$. As this occurs, however, when $A^1$ is attracted, there is contact between 28 and 29 and the current continues to flow through A by way of 35—29—28—36—99—Z, till the contact is broken in the telephone box at 5. The contact between 28 and 29 therefore acts as a safety to prevent the circuit being broken through A before the other operations can be completed which are incident to the pointer $N^1$ reaching the connection to an unemployed auxiliary switch. When the contact between J and 5 is broken by the rotation of the star wheel 204 under these circumstances, it permits the breaking of the circuit between 28 and 29. This leaves the circuit beyond A open in both directions, consequently further rotation of the crank 199 and star wheel 204 will have no effect whatever. It should be noted that magnet A normally is included in a bridge or branch from the subscriber's line 20 to battery Z. As soon as an idle link circuit or trunk extending to an idle auxiliary switch is found by pointer or wiper $N^1$ this bridge is interrupted at contact $C^1$, $B^7$ by the energization of test relay C, and line 20 is connected directly with wiper $N^1$ through 37, $B^6$, 39 and 40. Returning again to the circuit described as running through C and E, it will be seen that attracting $E^1$ closes the contact through $E^1$, 43 and 44 at the same time $B^6$ comes into contact with 39. When this occurs the current flows from Z—100—4—5—J—(this current being simultaneous with the one made between J and 5 and flowing through 28 and 29)—6—7—211—73—20—37—$B^6$—39—40—$N^1$—32—P—33—41—$E^1$—44—43—47—48—F—99—Z. The current through F moves the pointer P to a blank contact and consequently breaks its own circuit at this point, and also the original energizing circuit for E. As, however, this break occurs while 43 and 44 are in contact the current flows from 32 to 48 by way of 49, 44, 43, and 47. Also current continues to flow through E from battery Y by way of 49, 44 $E^1$ and 41 until contacts 26 and 27 of A are separated. The breaking of the circuit in the telephone box between J and 5 leaves the line through F open in both directions, consequently further rotation of the star wheel 204 will not affect F.

It will be seen that the general result of removing the receiver and turning the crank 199 is to move the pointers N and $N^1$, of the main switch connected to that particular telephone, step by step over their respective contact points until they reach one that is connected to an unemployed auxiliary switch. That when such a point is reached other circuits are completed that move the pointer of the unemployed auxiliary switch to a blank contact point and break all circuits so that a further rotation of the crank 199 is without effect. And also that moving the pointer of the auxiliary switch removes it from the unemployed class so that no other main switch can reach it until its pointer has been returned to normal position, because it is through that point that the connecting circuits are made. Secured to the spindle 203 of the star wheel 204 is a dial having numbers from 0 to 9 on its face, one of which shows through the opening shown in Fig. 11. The lower position of the crank 199 is its normal position, and when in this position either 0 or 5 shows at this opening because it takes two rotations of said crank to make one of the star wheel 204, which in turn makes ten contacts between J and 5 and rings the bell 207 at the completion of the tenth contact, which is when 0 shows at the opening. The reason for turning the crank till the bell rings once after moving the receiver, is to leave it at its normal position, and because there will seldom be as many as ten auxiliary switches in use at the same time. The crank may, however, be turned any number of times, but no effect will be produced after the first unemployed auxiliary switch is reached.

Pushing the button 170 once sends a current from battery Z—100—4—15—17—18—50—51—52—D (there being no current in line 20, D has no effect)—53—$A^1$—N—55—48—F—99—Z. This moves the pointer P to contact with wire 56, when, by again turning the crank 199 and making contacts between J and 5, the current flows from battery Z—100—4—5—J—6—7—211—$7^3$—20—37—$B^6$—39—40—$N^1$—32—P—56—G—99—Z. This moves the strips or contact devices K into contact with the first row of contact points R, and if four contacts are made at J—5, the strips K will be moved to the fourth row of contacts R. This would be when the figure 4 showed on the face of the dial. Then if the button 170 be again pushed, the circuit will be made in the same manner as before and the pointer P will be moved into contact with the line 60 that reaches the first contact strip K. If it is the sixth strip K that is wanted, then the button 170 is pushed six times: and if the strips K are on (or have been moved to) the fourth row of contacts R, then the pointer P is in electrical connection with the normal contact point for N of the forty sixth main switch.

It will be observed that after the pointer P has been moved into contact with the line running through G, each contact made by turning the crank 199 moves the strips K over ten contact points R, and as the ringing of the bell 207 indicates ten contacts at J, it also indicates one hundred contact points R. It will therefore be apparent that the number of hundreds is indicated by the number of the strokes of the bell 207: that the number of tens is indicated by the dial figure; and that the number of units is indicated by the number of times the button 170 is pushed. Thus if telephone No. 263 is wanted, the crank 199 is turned till the bell 207 rings twice and the figure 6 shows on the dial, then the button 170 is pushed three times.

Passing for the moment the ringing circuit, it will be assumed that the person called has removed his receiver, then the primary circuit will be as follows: W—89—211—213—88—91—219—90—W—. Starting at the secondary of the calling telephone, the talking circuit will be as follows: secondary —86—210—85—84—80—81—82—$J^1$—J—6—7—211—73—20— to the main switch belonging to the calling telephone —37—$B^6$—39—40—$N^1$—32— to the auxiliary switch which was selected —P— selected 60 to K on R in the selected row of contact points —98— to the normal of the main switch belonging to the telephone called —N—$A^1$—53—D—52—51—50— to the telephone called —18—17—16—75—87—secondary —86—210—85—84—80—81—82—$J^1$—J—6—7—211—73—20— back to the main switch of the telephone called —21—A—22—$B^7$—$C^1$— (the subscriber called did not send a circuit through the magnet C of his switch) 25—line 99 returning on the branch which leads to F of the auxiliary switch selected —48—55— to the main switch belonging to the calling telephone —N—$A^1$—53—D—52—51—50— to the calling telephone —18—17—16—75—87—secondary—which is the place of starting. When ringing to call, the subscriber pushes in the generator crank which makes a contact between 79 and 80. The circuit thus made is the same as the talking circuit just described, except that, in the telephone box, the current goes from 75 to 80 by way of 218—76—83—217—79—80, instead of by the way of the secondary.

Hanging up the receiver depresses the hook 211 which first tilts and then releases the lever 208, which in turn makes and breaks connection between contacts 71, 72 and 9. The current then flows from battery Z—100—72—71—19—50—51—52—D—53—$A^1$—N—55—48—F—99—Z, energizing electromagnets D and F in series.

Closing the contacts between $D^1$ and 62 by the action of D, and between contacts 9 and 72 by the hanging up of the receiver closes a second circuit from Z—100—72—9—73—20—61—62—$D^1$—64—B—65—99—Z. Simultaneously with this a third circuit goes from Z following the same course, but branching from 20 to 37—$B^6$—39—40—$N^1$—32—P—$F^1$—66—67—45—46—68—H—99—Z. Contact between $F^1$ and 66 was made when electromagnet F was energized in series with electromagnet D over the first release circuit traced above. Closing the second circuit through B breaks the third circuit between $B^6$ and 39, but the first circuit furnishes a branch (closed by the same action of B) from $A^1$—N—$B^5$—70—40—$N^1$, etc., as given for the third circuit. Making and breaking the circuit through B returns the pointers N and $N^1$ to their normal position and engages $B^7$ with the hook of $C^1$. The circuit through H releases P and K and permits them to return to their normal position. It should be observed that the release circuit just traced for release magnet H, of the auxiliary switch or final connector, includes the test contact, engaged by test wiper or pointer $N^1$ of the main switch individual to the calling line, by means of which said main switch determines the idle condition of said auxiliary switch and selects said switch and its connecting link or trunk circuit for use in establishing the talking circuit.

In case the receiver should be hung up without connection having been made to any auxiliary switch, then no current would have been sent through C and consequently $B^7$ would be in contact with the hook of $C^1$. Then the current would be Z—100—72—9—73—20—21—A—22—$B^7$—$C^1$—25—99—Z. The current through A closes the contact between 24 and 69 when a current would flow: Z—100—72—71—19—50—51—23—24—69—64—B—65—99—Z, which would return the pointers N and $N^1$ to normal.

It will be apparent that the simple act of hanging up the receiver returns all parts to their original position ready for the next call without the necessity of ringing off or requiring the interposition of an operator at central.

In Fig. 19 the talking circuit above described is indicated by the heavy lines extending from the calling subscriber's station at the right of the figure to the called subscriber's station at the left; it passes through wipers N, N′, of the calling subscriber's individual non-numerical trunk hunting switch, marked main switch, and the automatically selected first idle trunk leading to the idle auxiliary switch by which connection finally is made with the desired called line as follows:—One limb 32 of the trunk extension of the calling line is extended through wipers P and K of the auxiliary switch and through normally closed contacts and electromagnet D of the called subscriber's main switch, to the called subscriber's station. The other limb 48, of the trunk extension of the calling line, connects with the called line over a portion of the common battery lead 99 and through normally closed contacts $C^1$, $B^7$ and electromagnet A of the called subscriber's individual main switch.

This Fig. 19 also serves to show, more clearly than any of the other figures, the relation to the talking circuit of the several bridged control magnets at the main and auxiliary switches.

To simplify Fig. 19 as much as possible, only so much of the apparatus has been diagrammatically indicated as is necessary to understand the circuits, and many of the parts are shown out of their actual mechanical relation indicated in other figures of the drawings. To avoid the complication caused by running the circuits back and forth as in Figs. 13 and 14, the contacts of relays B, C and D have been placed away from the relays, but in each instance the reference character of the relay, which either opens or closes a particular set of contacts has been placed in a circle adjacent said contacts.

What I claim is:

1. A series of contact points arranged in rows, a series of separate strips adapted to come into electrical contact with the contact points of successive rows by successive steps, a dial, electrical connections from the several strips to a corresponding series of other contact points on the dial, a pointer and devices for moving it into successive contact with the contact points on the dial, a switch, connections from said pointer to the switch and from the switch to a telephone station, and means for operating the devices for moving the pointer through the connections between said pointer and said station.

2. A series of contact points arranged in rows, a series of separate contact devices adapted to be moved into contact with successive rows of contact points, a dial provided with a series of other contact points, a separate connection from each contact device to a separate contact point on the dial, a pointer adapted to be moved over the contact points on the dial, separate propelling mechanisms for moving the contact devices and the pointer, a switch and a telephone station, connections from said pointer to said switch and from the switch to said station, and means for operating said propelling mechanisms from said station so as to place the station in electrical connection with any one of the first mentioned contact points.

3. In an automatic telephone exchange, a series of main switches each consisting of series of contact points, a contact maker and a magnet for moving the contact maker step by step over said contact points, said main switches being greater in number than the number of contact points on any one of them, a series of auxiliary switches equal in number to the number of contact points on one main switch and each auxiliary switch having as many contact points as there are main switches, connections from corresponding contact points on the main switches to corresponding auxiliary switches, and return connections from the contact points of the auxiliary switches to normal contact points on all of the main switches.

4. A series of contact points arranged in rows, a series of switches each one of which has a normal contact point, a separate connection from each contact point to the normal contact point of a different switch, a series of contact devices and means for moving them into successive contact with the rows of contact points, a dial, a series of other contact points located in said dial, a pointer and devices for moving it over the contact points on the dial, separate connections from the contact devices to corresponding contact points on the dial, other contact points on each switch adjacent to the said normal contact point thereon, a connection from each of the other contact points on any one of said switches to the said pointer and other similar pointers, a telephone station for each switch, connections between each station and its corresponding switch, and means for operating the said devices from any station so as to make electrical connections therefrom to any other station.

5. A switch having a frame, a pointer having one end in electrical connection with said frame and the other end insulated therefrom, a dial having a series of insulated contact points for each end of said pointer, means for moving said pointer from normal position to successive contact points, an auxiliary switch having a pointer adapted to sweep over one set of contact points and a series of contact devices adapted to be moved over a second series of contact points, devices for moving the pointer and contact devices on the auxiliary switch, a telephone station and connections to said switches, and means for controlling the moving devices from the station so as to establish an electrical connection from said station through both pointers and one contact device to any required contact point in the said second series.

6. A main switch consisting of a pointer, a series of insulated contact points and a magnet for moving said pointer to any contact point, a series of auxiliary switches, connections from each contact point on the main switches to a different auxiliary switch, a pointer and a plurality of contact points on each auxiliary switch, a row of contact devices and a plurality of rows of contact points therefor also on said auxiliary switch, connections from each of said contact devices to a different one of the first mentioned plurality of contact points on said auxiliary switch, other connections from each contact point in said rows to a different main switch each of which is similarly connected to said auxiliary switches, wires from said magnet to a telephone station, and devices located at the station for completing an electric circuit through said magnet.

7. In a telephone exchange, the combination with a series of main switches each of which is individual for a connected telephone station and each of which consists of a series of electrical connections less in number than the number of switches, a contact maker and a magnet for moving the contact maker step-by-step into successive connection with the electrical connections, of a series of auxiliary switches equal in number to the number of connections on one main switch and connected to all of the main switches, each auxiliary switch being provided with a separate connection for each main switch, means for automatically selecting an unemployed auxiliary switch by the movement of the contact maker of a main switch, means for isolating the selected auxiliary switch by a movement produced therein as the result of an electrical impulse sent over the conductor to it, and means whereby an operation of one main switch and one auxiliary switch so selected will serve to establish telephonic connections between the moved main switch and any other main switch in the exchange.

8. A main switch and a series of auxiliary switches, a pointer on the main switch movable into electrical connection with any one of the auxiliary switches, a pointer on each auxiliary switch adapted to shift such electrical connection to any one of several contact devices also on such auxiliary switch, a row of such devices adapted to be moved to successive rows of contact points, a magnet for moving the pointer and a separate magnet for moving the contact devices, a telephone station connected to the main switch, and means for operating said magnets from said station.

9. A series of rows of insulated contact points, a row of contact devices and a magnet for moving them into electrical connection with successive rows of points, a pointer and a magnet for moving it into electrical connection with any of said contact devices, a series of such pointers each one of which is connected to a similar group of contact devices and rows of contact points, a main switch and a magnet for moving it into electrical connections with any one of said pointers, a telephone station and connections to said main switch, and means for operating said magnets from said station.

10. In a telephone exchange, a switching system consisting of the following elements: first, a switch movable to electrical connections with any one of a series of pointers; second, a series of such pointers, each one of which is movable to any one of a group of contact devices; third, a group of such contact devices for each pointer, each group of which is movable to successive rows of contact points; and fourth, magnets for moving the switches and the pointers.

11. In a telephone exchange, a switch movable to electrical connection with any one of a series of pointers, a series of such pointers each one of which is movable to electrical connection with any one of a group of contact devices, a group of such contact devices for each pointer each group of which is movable to successive rows of contact points, magnets for moving the switches and the pointers, other magnets for releasing the switches and the pointers from their propelling magnets, and means for returning said devices to their normal positions when so released.

12. A telephone station, a switch connected to said station and movable to electrical connection with any one of a series of pointers, a series of such pointers each one of which is movable to electrical connection with any one of a group of contact devices, a group of such contact devices for each pointer each group of which is movable to successive rows of contact points, magnets for moving the switches and pointers, other magnets for releasing the switches and pointers from their propelling magnets, springs for returning them to their normal positions when so released, and devices located at said station for operating the several magnets.

13. A telephone station, a switch connected to said station and movable to electrical connection with any one of a series of pointers, a series of such pointers each one of which is movable to electrical connection with any one of group of contact devices, a group of such contact devices for each pointer each group of which is movable to successive rows of contact points, magnets for moving the switches, the pointers and the contact devices, means for operating said magnets from said station, other stations connected to the different contact points, each station of which is similarly connected to a switch, and means whereby similar magnets can be operated from any of the other stations.

14. A series of switches any one of which is movable to electrical connection with any one of a series of pointers, a series of such pointers any one of which is movable to electrical connection with any one of a group of contact devices that belongs to it, a group of such contact devices for each pointer each group of which is movable to electrical connections with successive rows of contact points, a series of rows of such contact points for each group of contact devices, separate magnets for moving the switches, the pointers and the contact devices, and means for automatically stopping the movement of any switch as soon as its magnet has moved it to electrical connection with a pointer to which no other switch is connected.

15. A group of contact devices adapted to be moved to contact with successive rows of contact points, a pointer adapted to be moved into electrical connection with any one of said contact devices, a switch adapted to be moved into electrical connection with any one of a series of such pointers, separate magnets for moving the switches, the pointers and the contact devices, a crank and a push button and contact closing devices operated thereby, means for operating the magnet for moving the pointer by the contact closed by the push button, and means for operating the magnet for moving the switch by a series of contacts made by the movement of said crank.

16. In a telephone exchange, a main switch for each telephone, a double series of contact points on each switch, a corresponding series of auxiliary switches each of which is provided with a pointer and a magnet for moving it, a connection from the pointer of each auxiliary switch to a corresponding contact point on one series of the double series of contact points and from the magnet for moving such pointer to the corresponding contact point on the other series of contact points, a double armed pointer and a magnet for moving it so that when electrical connection is made from a main switch to the pointer on an auxiliary switch a simultaneous connection will be made that will move such pointer to a new position.

17. In a telephone exchange, a series of main switches each of which is individual to a connected telephone, a lesser series of auxiliary switches each of which is common to all telephones in the exchange, a pointer and a group of contact devices on each auxiliary switch, a second pointer on each main switch and means for moving it to electrical connection with the pointer of any one of the auxiliary switches, a magnet on each auxiliary switch for moving its pointer into electrical connection with any contact device of the group thereon, and a second magnet for moving the group of contact devices so as to extend the connection from said pointers to any telephone in the exchange.

18. In a telephone exchange, a series of main switches each of which is individual for a connected telephone, a lesser series of auxiliary switches each of which is common for all telephones, a pointer on each auxiliary switch, a magnet for moving it, devices on each main switch for moving it to electrical connections with the pointers of successive auxiliary switches, means for automatically stopping the movement of a moved main switch when it reaches electrical connection with a pointer which is in normal position, and automatic means for sending an electrical impulse through such pointer and its operating magnet.

19. In a telephone exchange, a series of main switches each of which is individual for a connected telephone, a lesser series of auxiliary switches each of which is common for all telephones, a pointer on each auxiliary switch normally serving as an electrical connection to a magnet for moving it, a magnet for so moving it so as to break such electrical connection, devices on each main switch for moving it to electrical connection with the pointers of successive auxiliary switches, a magnet on each main switch for disconnecting the moving devices therefor, and means for connecting the magnet on a moved main switch in series with the magnet of an auxiliary switch which has its pointer in its normal position.

20. In a telephone exchange, a series of main switches each of which is individual for a connected telephone, a series of auxiliary switches each of which is common for all telephones, a pointer on each auxiliary switch normally serving as an electrical connection to a magnet for moving it, a magnet for so moving it so as to break such electrical connection, devices on each main switch for moving it to electrical connections with successive pointers, means for sending an electrical impulse through a moved main switch and the first pointer resting in its normal position so as to operate its magnet and break the circuit through which such impulse is sent, and means for sending other electrical impulses through the same magnet over other connections so as to advance the moved pointer to other electrical connections.

21. In a telephone exchange, a series of main switches each of which is individual for a connected telephone, a series of auxiliary switches each of which is common for all telephones, a contact closing magnet and an operating magnet on each auxiliary switch, a pointer on each auxiliary switch normally in electrical connection with the contact closing magnet and with an operating magnet through the contact made by the other magnet, means for moving each main switch into electrical connections with the pointers and the operating magnets of successive auxiliary switches, and means for sending an electrical impulse through a moved main switch and the operating magnet of the first auxiliary switch whose pointer is in its normal position whereby such pointer is moved so as to break the circuit through which such impulse is sent.

22. In a telephone exchange, a series of main switches each of which is individual for a connected telephone; a lesser series of auxiliary switches each of which is common for all telephones; a pointer and a magnet for moving it on each auxiliary switch; devices on each main switch for moving it into coincident electrical connections with the pointers and their respective magnets of successive auxiliary switches; means for sending an electrical impulse through a main switch, the first pointer resting in its normal position and the magnet for moving it whereby said pointer is moved so as to break the circuit through which said impulse is sent; and means for sending other electrical impulses through said magnet by the other coincident electrical connection whereby the moved pointer may be advanced to make new electrical connections.

23. In an auxiliary switch adapted to be used by any telephone in a telephone exchange, a pointer and a series of contact points therefor, a contact closing device and a magnet for operating it, an electrical connection from the normal contact point to one side of the contact closing device and to the magnet for operating it, a second magnet for moving said pointer and a connection from said magnet to the other side of the contact closing device whereby an electrical impulse sent through said pointer will send another impulse through the operating magnet and thereby move the pointer so as to break its own circuit, and means for sending other electrical impulses through said operating magnet over another course.

24. In a telephone exchange, a series of main switches individual to connected telephones, a series of auxiliary switches common to all telephones, a pointer and a series of contact points on each auxiliary switch, a magnet for moving each pointer, devices for moving a main switch into simultaneous but independent electrical connections with the pointers and their respective magnets of successive auxiliary switches, means for sending an electrical impulse through a moved main switch to the first pointer in its normal position and the magnet for moving it so that the circuit for said impulse will be broken, means for advancing a moved pointer so as to complete a new circuit through said pointer, a second magnet located in the new circuit, a series of contact devices moved by the second magnet, and means for again advancing said moved pointer so as to make electrical connections to any one of said contact devices.

25. A series of contact devices, a plurality of corresponding series of contact points, means for moving the series of contact devices to successive series of contact points, a second series of contact points and electrical connections from the several contact devices to different contact points of the second series, a pointer and means for moving it to successive contacts with the contact points of the second series, and a switch and means for moving it into electrical connection with any one of a series of such pointers.

26. The combination with the stations of a telephone exchange, a main switch for each station and located at a central office, each main switch being provided with a comparatively small number of electrical connections which are closed in succession by the operation of the switch, a lesser number of auxiliary switches also located at the central office and each auxiliary switch being provided with a comparatively large number of electrical connections, of means controlled from each station for moving its switch successively to electrical connection with different ones of the auxiliary switches so as to automatically select an idle switch of larger capacity, and means also controlled from the station for operating the automatically selected switch so as to extend electrical connections to any one of a large number of main switches.

27. The combination with the stations of a telephone exchange, and a main switch for each station, each main switch being provided with a small number of electric terminals to which it closes electrical connections in succession when moved, of a series of auxiliary switches corresponding in number to the number of terminals on each main switch and each auxiliary switch being provided with a large number of electrical connections extending therefrom, and means controlled from each station for moving its main switch step-by-step to successive electrical connection with its terminals so as to automatically select an idle one of the auxiliary switches.

28. The combination with a large number of main switches of small capacity and each arranged to close a plurality of electrical connections in succession by a forward step-by-step movement, and a small number of auxiliary switches each of large capacity and each also operating by a step-by-step movement, of a telephone station connected to each main switch, and means controlled from each station and operating through its switch of small capacity for automatically selecting and isolating for the use of a calling station an idle one of the switches of large capacity.

29. The combination with a large number of main switches operated by ratchet wheels, each switch of which is provided with a small number of stationary contact points each of which is the terminal of an electrical connection, and a small number of auxiliary switches each of which is reached through a different contact point on any main switch and each of which is provided with a large number of contact points arranged in a plurality of rows, of a telephone station connected to each main switch, means controlled from any station for moving its main switch step-by-step into successive electrical connection with its contact points so as to automatically select through one of them an idle one of the auxiliary switches, and means also controlled from the station for operating the automatically selected switch so as to complete electrical connection to any one of the contact points in any one of its rows.

30. The combination with a large number of contact makers, each of which is provided with a single series of contact points, a ratchet mechanism and a magnet associated with each contact maker for moving it step-by-step into successive connections with its contact points, and a telephone station connected to each contact maker and its magnet, of a small number of switching mechanisms each provided with a plurality of series of contact points whereby each such switching mechanism has a large range in the making of electrical connections, means controlled from each station for operating its magnet so as to advance its contact maker over its contact points and thereby to automatically select an idle one of said switching mechanisms, and means also controlled from the same station for operating the selected switching mechanism so as to complete electrical connection to any contact point in any one of its different series of contact points.

31. In a telephone exchange, the combination with a series of switches each provided with a large number of contact points by means of which it has a large range in the making of different electrical connections, and inter-connections between the contact points of the different switches by means of which each switch is capable of reaching the same connections as each other switch, of a series of contact makers corresponding in number to the number of contacts makable by said switches and each contact maker having a much less number of contact points by reason of which its range in making electrical connections is much more limited than is the range of said switches, a ratchet mechanism and a magnet for each contact maker arranged so as to move their contact maker step-by-step over its contact points, a telephone station connected to each contact maker and to the magnet for moving it, and means controlled from each station for operating its connected magnet so as to advance its contact maker to successive electrical connections with its contact points and thereby to select an idle one of said switches whereby a calling station has placed at its service a switching mechanism of greater range of operation than that which is normally associated therewith.

32. In a telephone exchange, the combination with a series of switches each provided with a large number of contact points by means of which it has a large range in making electrical connections, and inter-connections between the contact points of the different switches by means of which the range of each switch in making connections is co-extensive with that of the other switches of the series, of a second series of switches much more numerous than the switches of the first series and each having a much smaller number of contact points whereby its range in making electrical connections is much less than the range of the switches of the first series, inter-connections between the contact points of the switches of the second series whereby the range of all in the series is co-extensive, each of which interconnections is provided with a branch to a different one of the switches of the first series, a ratchet mechanism and a magnet for each switch of the second series and so arranged that by operating a magnet the switch to which it belongs is moved so as to make electrical connections in succession to the switches of the first series, a different telephone station connected to each switch of limited range, and means controlled from each station for operating the magnet of its connected switch so as to advance it step-by-step and thus to select an idle one of the switches in the first series whereby a calling station has placed at its service a switch having a much greater range of operation than the switch normally associated therewith.

33. The combination with a series of step-by-step switching mechanisms, each mechanism having a comparatively small number of stationary contact points and corresponding contact points of the different mechanisms being connected together by interconnections, and a telephone station connected to each mechanism, of a relatively large switching mechanism connected to each interconnection, each large switching mechanism having a large number of contact points and a correspondingly large range in the making of electrical connections, and means controlled from each station for causing the operation of its step-by-step mechanism to automatically select an idle one of the large switching mechanisms whereby a calling station has placed at its service a mechanism of larger range than that normally associated therewith.

34. The combination with a battery, and a circuit breaking magnet normally disconnected from both poles of the battery, of a switching mechanism arranged to be moved so as to complete a connection from one side of the battery to the magnet, devices for moving the switching mechanism step-by-step to find such a connection, and a temporary connection made by said devices between said magnet and the other side of said battery at the time of making each forward step of the switching mechanism.

35. The combination with a switching mechanism, devices for moving it, a battery, and a magnet for controlling the stoppage of the switching mechanism, of means operated by the movement of the switching mechanism for controlling the connection of the magnet to the battery.

36. The combination with a switch-selecting mechanism, and electrically-operated devices for moving said mechanism, of a magnet for breaking the circuit of the electrically-operated devices, a battery, and means for controlling the connection of the battery to the magnet by the operation of the electrically-operated devices.

37. The combination with a switching mechanism, electrically-operated devices for moving it, and a circuit for said devices, of automatically operating means for breaking said circuit when said switching mechanism has reached a desired connection, and a branch circuit for said devices temporarily closed by the operation of the devices whereby the premature breaking of the circuit is prevented.

38. The combination with a switching mechanism, a series of electrical connections to which the switching mechanism may be successively moved, electrically-operated devices for so moving it, and a circuit by means of which the electrically-operated devices are operated, of a magnet controlling said circuit so as to cause a stoppage of said switching mechanism at a desired time, and a separate circuit for said magnet, said separate circuit being controlled by said switching mechanism so as to cause a breaking of the first mentioned circuit when the switching mechanism is moved to a non-busy connection.

39. A switching mechanism provided with a contact maker adapted to be moved successively to the electrical connections of other switches, a series of such other switches, a telephone station provided with a normally open connection to the contact maker being moved, and means by which upon reaching connection to an idle switch in said series said contact maker will be automatically stopped and its open connection to said station will be closed.

40. The combination with the stations of a telephone exchange, a comparatively small main switch for each station and located at a central office, and lesser number of comparatively large auxiliary switches also located at the central office, of means controlled from each station for operating its small switch so as to automatically select an idle one of the larger switches, and means also controlled from the station for operating the automatically selected switch so as to extend electrical connections to any desired one of a large number of small switches.

41. The combination with the stations of a telephone exchange, and a main switch for each station, each main switch being provided with a small number of electrical connections extending therefrom, of a series of auxiliary switches corresponding in umber to the number of connections of each main switch and each auxiliary switch being provided with a large number of electrical connections extending therefrom, and means controlled from each station for operating its small main switch so as to automatically select an idle one of the larger auxiliary switches.

42. The combination with a large number of main switches each of small capacity, and a small number of auxiliary switches each of large capacity, of a telephone station connected to each main switch, and means controlled from each station and operating through its switch of small capacity for automatically selecting and isolating for the use of a calling station, an idle one of the switches of large capacity.

43. The combination with a large number of main switches, each of which is provided with a small number of contact points, and a small number of auxiliary switches each of which is reached through a different contact point on a main switch, and each of which is provided with a large number of contact points arranged in a plurality of rows, of a telephone station connected to each main switch, means controlled from any station for moving its main switch so as to automatically select through one of its contact points an idle one of the auxiliary switches, and means also controlled from the station for operating the automatically selected switch so as to complete an electrical connection to any one of the contact points in any one of its rows.

44. The combination with a large number of small switches, each provided with a single series of contact points, and a small number of large switches each provided with a plurality of series of contact points of a telephone station connected to each small switch, means controlled from each station for operating its small switch so as to automatically select an idle one of the large switches, and means also controlled from the same station for operating the selected large switch so as to complete electrical connection to any contact point in any one of its different series of contact points.

45. In a telephone exchange, the combination with a series of switches each provided with a large number of contacts by means of which it has a large range in the making of different electrical connections, and interconnections between the contact points of the different switches by means of which each switch is capable of reaching the same connections as each other switch, of a series of other switches each having a much less number of contacts by reason of which its range in making electrical connections is much more limited than the range of the first mentioned switches, a telephone station connected to each of the switches having the more limited range, and means controlled from each station for operating its connected switch of limited range so as to select an idle one of the first mentioned switches whereby a calling station has placed at its service a switch having a greater range of operation than the switch normally associated therewith.

46. In a telephone exchange, the combination with a series of switches each provided with a large number of contact points by means of which it has a large range in making electrical connections, and interconnections between the contact points of the different switches by means of which the range of each switch in making connections is co-extensive with the other switches of the series, of a second series of other switches much more numerous than the switches of the first series and each having a much smaller number of contact points whereby its range in making electrical connections is much less than the range of the switches of the first series, interconnections between the contact points of the switches of the second series whereby the range of all in the series is co-extensive, each of which interconnections is provided with a branch to a different one of the switches of the first series, a different telephone station connected to each switch of limited range, and means controlled from each station for operating its connected switch so as to select an idle one of the switches in the first series whereby a calling station has placed at its service a switch having a much greater range of operation than the switch normally associated therewith.

47. The combination with the stations of a telephone exchange, and a small switching device for each station, of a plurality of larger switching devices less in number than the stations of the exchange, and means controlled from each station for operating its small device so as to automatically select an idle one of the larger devices and for isolating it for the use of the station connected to the operated small device.

48. In an automatic telephone exchange, a series of electrically operated switches termed main switches each of which is provided with contact points for making electrical connections, said series of switches being greater in number than the number of contact points on one of them, a telephone station connected to each main switch, a series of auxiliary switches the number of which is equal to the possible number of electrical connections of one main switch, a series of contact points on each auxiliary switch the number of which is equal to the whole number of main switches in the exchange, and means whereby upon a movement of one main switch and one auxiliary switch the moved main switch may be electrically connected to any one of the other main switches.

49. In a telephone exchange, the combination with a series of main switches each of which is individual for a connected telephone station and each of which is provided with electrical connections less in number than the number of such switches, of a series of auxiliary switches equal in number to the number of connections on one main switch and connected thereto, means for automatically selecting an unemployed auxiliary switch by the movement of a main switch, means for isolating the selected auxiliary switch by means of an electrical impulse sent over the conductor to it, and means whereby a movement of one main switch and one auxiliary switch so selected will serve to establish telephone connections between the moved main switch and any other main switch in the exchange.

50. In an automatic telephone exchange, a series of main switches, each of which is individual for a connected telephone station, a telephone station connected to each main switch, a lesser series of auxiliary switches each of which is common for all stations, magnets on said auxiliary switches for operating them, a series of contact points on each main switch, one of which is the normal contact point, other contact points on each auxiliary switch, a direct connection from the normal contact point on each main switch to a definite and correspondingly located contact point on each auxiliary switch, and other direct connections from other contact points of each main switch to corresponding magnets on all of the auxiliary switches.

51. In a telephone exchange, a series of main switches each individual for a connected telephone station, a lesser series of auxiliary switches common for all stations, a pointer and a group of contact devices on each auxiliary switch, means for moving each main switch into electrical connection with any pointer, a magnet on each auxiliary switch for moving its pointer to electrical connection with any contact device of the group of contact devices, and a second magnet for moving the group of contact devices to successive positions.

52. A series of contact points arranged in rows, a row of contact devices, a magnet for moving said contact devices into contact with successive rows of contact points, a series of other contact points and a pointer adapted to be moved over them; a magnet for so moving it, a connection from each contact device to a separate point of the series belonging to the pointer, a telephone station connected to each contact point in the rows of contact points, and means for operating said magnets from any one of said stations.

53. In an automatic telephone exchange, a series of trunk selecting switches, a series of inter-connecting wires connected to correspondingly placed contact points on each switch, a second series of inter-connecting wires connected to other correspondingly placed contact points on each switch, means for operating switches to move them over their contact points, and means controlled through one series of said inter-connecting wires for automatically stopping each switch when it reaches a position which does not correspond with a position at the time occupied by some other switch.

54. A series of telephone stations, and a corresponding series of switches connected thereto, a lesser series of auxiliary switches any one of which is adapted to serve as an intermediate connection between any two stations, a contact closing device and a crank for operating it located at each station, and means whereby the turning of one of said cranks will operate devices for automatically selecting the first unemployed switch as such an intermediate connection.

55. A series of telephone stations provided with connections to a central exchange, a series of electrical devices located at such exchange, means whereby by a series of selective operations said devices operate to establish telephonic connections between any two stations, said selective operations being accompanied by operative steps producing electrical connections not forming part of the telephonic connections, a crank located at each station, and means whereby such operative steps will be automatically made by turning one of said cranks.

56. In an automatic telephone exchange, the combination with the stations of the exchange, trunk connections less numerous than the stations and arranged in pairs, and a trunk selecting switch for each station, of means for operating the switches from their respective stations, and means controlled by impulse flowing over one wire of a pair of trunks for stopping moved switches in connection with the other wire of an idle pair.

57. In a telephone exchange, a series of main switches and a lesser series of auxiliary switches, a telephone station connected to each main switch, selecting devices at each station, means by which an operation of a selecting device will automatically extend the station connections to an idle one of said auxiliary switches and then break the connections of the selecting device so that further operation thereof will be inoperative upon said switches, means for reestablishing the connections of said selecting device, and means by which a further operation of the selecting device will then cause a desired operation of the selected auxiliary switch.

58. In a telephone exchange, the combination with an impulse sending device, and a plurality of subscribers' lines any one of which may be a called line, of a switch of relatively small capacity associated with the impulse sending device, the capacity of the switch being represented by the number of different connections which the switch is capable of making, a switch of relatively large capacity associated with each one of the connections of the previously mentioned switch, means controlled from the impulse sending device for operating the switch of small capacity so as to automatically select an idle one of the switches of large capacity, and means also controlled from the impulse sending device for operating the automatically selected switch so as to select a desired one of the subscribers' lines as a called line.

59. In a telephone exchange, the combination with a series of calling devices, a corresponding series of switches of relatively small capacity, and a large number of subscribers' lines any one of which may be a called line, of a series of switches of relatively large capacity, means controlled from any one of the calling devices and operating through the corresponding switch of small capacity for automatically selecting an idle one of the switches of large capacity, and means controlled from the same place for operating the automatically selected switch to select a desired one of the subscribers' lines.

60. In a telephone exchange, the combination with a series of telephone stations, a series of station selecting switches of relatively large capacity, and a series of switch selecting switches of relatively small capacity, of a series of calling devices, means controlled from the calling devices for operating the small switches so as to automatically select idle ones of the large switches, and means controlled from the same places for operating the large switches to select desired stations as called stations.

61. In a telephone exchange, the combination with a series of small switches for automatically selecting idle trunks to establish telephonic connections, and a series of large switches for selecting subscribers' lines to complete telephonic connections to called stations and trunk line connections from the small switches to the large switches, of a source of electricity and a series of calling devices for operating said switches.

62. A spindle provided with two arms insulated from each other, means for rotating said spindle step-by-step so as to move said arms, a series of contact points in the path of each arm, a series of switches, electrical connections from the different contact points of one series of points to the different switches of the series of switches, and other electrical connections from the different contact points of the other series of points for automatically stopping the rotation of the spindle with one of its arms on an electrical connection leading to an idle switch of the series of switches.

63. A spindle provided with two arms insulated from each other, propelling devices for rotating said spindle so as to move said arms, a series of contact points in the path of each arm, a magnet for controlling the propelling devices, a series of switches, electrical connections from the different contact points of one series of points to the different switches of the series of switches, and other electrical connections from the contact points of the other series of points and serving to control the operation of said magnet.

64. The combination with a trunk selecting switch, trunks connected thereto, and means by which the switch when moved is automatically stopped in connection with an idle trunk, of a magnet and armature for advancing the switch, a circuit for said magnet and means for closing it so as to operate the magnet, and a branch circuit for said magnet temporarily closed by the movement of the armature thereof.

65. The combination with a series of switches each provided with a spindle having two arms insulated from each other, a series of contact points in the path of each arm, and a series of wires for each series of contact points, each wire being connected in multiple to corresponding contact points in the different series, of two magnets and a calling device associated with each switch, means initiated at any calling device for sending electrical impulses through one of its corresponding magnets so as to advance the arms of the associated switch step-by-step to their contact points, and means controlled by the second of the associated magnets and the multiple connections of one series of contact points for breaking the circuit of the first named magnet so as to automatically stop the moving arms on the contacts of idle ones of the interconnecting wires.

66. The combination with a series of trunk lines part of which are busy and part of which are idle, and a switch adapted to be moved into connection with any of said lines, of an operating magnet and a stopping magnet, connections from the operating magnet for moving said switch and also for temporarily closing its own circuit, and means associated with the stopping magnet for breaking the circuit of the operating magnet when the switch reaches connection to the first idle one of said trunks.

67. A telephone exchange system comprising a subscriber's telephone line, a plurality of link-circuits extending therefrom, automatic switching means for establishing connection between said line and an idle one of said link-circuits, means for restoring said switching means to normal position, and means for placing said restoring means under the control of the subscriber in case all of said link-circuits are in use.

68. A telephone exchange system comprising a subscriber's telephone line, a plurality of link-circuits, electrically controlled switching means for automatically establishing connection between said line and the first encountered idle one of said link-circuits, means for restoring said switching means to normal position, and means for placing said restoring means under the control of the subscriber in case all the encountered link-circuits are in use.

69. A telephone exchange system comprising a plurality of subscribers' telephone lines, multiple interconnecting link-circuits, automatic switching means for selecting an idle one of said link-circuits and completing connection therethrough between a calling line and a called line, means for restoring said switching means to normal position, and means for placing said restoring means under the control of the subscriber in case all of said multiple link circuits are in use.

70. A telephone exchange system comprising a subscriber's telephone line,, a plurality of link-circuits, electrically controlled switching means for automatically establishing connection between said line and the first encountered one of said idle link-circuits, means for restoring said switching means to normal position, relay mechanism for controlling the operation of said restoring means, and means for placing said relay mechanism under the control of the subscriber in case all the encountered link-circuits are in use, whereby subscriber may then restore said switching means to normal.

71. A telephone exchange system comprising subscribers' telephone lines, "selector" switches for extending the circuits of calling lines, a plurality of link-circuits connected to each "selector" switch and available for connection with a calling line, means for restoring an actuated "selector" switch to normal, and means for placing said restoring means under the control of the calling party in case all of the link-circuits available to his line are in use.

72. A telephone exchange system comprising subscribers' lines, a "selector" switch individual to each line for extending its circuits, a plurality of link-circuits connected to each "selector" switch and available for connection to its line, means for restoring an actuated "selector" switch to normal, and means for placing said restoring means under the control of the calling party in case all of the link-circuits available to his line are in use.

73. A telephone exchange system comprising a selector provided with a side switch, a release relay for releasing said selector while the side switch is in one position, and a release relay for releasing said selector while the side switch is in another position.

74. In a telephone system, a line, another line, a selector, means for operating it to connect said lines, a release magnet for the selector, a relay for controlling said release magnet after the second line has been selected, another relay for independently controlling said release magnet, and means for operating one or the other of said relays to bring about release.

75. An automatic telephone system comprising subscribers' switching devices for sending an impulse or impulses over the line preliminary to calling the desired number, and for then sending impulses representing the digits of the called number, adapted to come to rest after operation thereof to transmit current for one digit of the called number and before operation for the next digit, automatic switching apparatus responsive to said preliminary impulse or impulses to establish a connection to be used for talking purposes, additional switching apparatus responsive to the impulses representing the digits of the called number to extend a connection to the called line, a busy test circuit for said connection, and means individual to the calling line for altering the potential of the said busy test circuit to protect the connection from intrusion.

76. In a telephone exchange system, the combination of subscribers' telephone lines, trunk-lines for switching and talking purposes, stationary individual line-relays for said telephone lines, normally at rest automatic means for automatically trunking in advance of any operations relative to the called number, controlled by said line relays, means for then connecting in accordance with the called number, and means individual to each line for rendering a selected trunk unselectable.

77. In a telephone system, the combination of subscribers' telephone lines, trunks adapted for talking purposes and less in number than said telephone lines, individual line-relays for said telephone lines, means controlled by said relays for performing a non-numerical rotary switching operation and thereby selecting an idle trunk, suitable means for then connecting in accordance with all the digits of the called number to extend connection from said selected trunk line to the called subscriber's line, a busy test circuit for each trunk, and means individual to the line for altering the busy test circuit for making the selected trunk busy.

78. In a telephone system, the combination of subscribers' telephone lines, trunk lines for talking purposes, automatic means for connecting a calling telephone line with an idle trunk-line without reference to the called number, suitable switching apparatus for then extending the connection in accordance with the called number, said apparatus comprising connectors having multiple line-terminals permanently connected with said telephone lines, said terminals arranged in different levels, each connector having a wiper adapted to move from one level to another, and means for then selecting a desired line terminal in the selected level.

79. A telephone system comprising a subscriber's individual trunk-selecting switch, a plurality of trunk lines leading from said individual switch and subscribers' means for operating said switch, said switch being provided with a controlling relay having normally open contacts, and two normally open energizing circuits for said relay, one of which circuits is controlled by said normally open contacts, the other being controlled from the subscriber's station.

Signed at New York, New York, U. S. A., this 11th day of November, 1915.

FRANK A. LUNDQUIST.

Witnesses:
ALBERT C. WIECHERS,
ROBERT E. WILLIAMS.